US012585711B2

(12) United States Patent
Osha

(10) Patent No.: US 12,585,711 B2
(45) Date of Patent: Mar. 24, 2026

(54) SYSTEMS AND METHODS FOR WEB SCRAPING

(71) Applicant: Topmarq, Inc., Austin, TX (US)

(72) Inventor: Quinn Osha, Austin, TX (US)

(73) Assignee: Topmarq, Inc., Austin, TX (US)

( * ) Notice: Subject to any disclaimer, the term of this patent is extended or adjusted under 35 U.S.C. 154(b) by 0 days.

(21) Appl. No.: 18/180,839

(22) Filed: Mar. 8, 2023

(65) Prior Publication Data

US 2023/0306066 A1 Sep. 28, 2023

Related U.S. Application Data

(60) Provisional application No. 63/317,945, filed on Mar. 8, 2022.

(51) Int. Cl.
| | |
|---|---|
| *G06F 16/951* | (2019.01) |
| *G06F 16/957* | (2019.01) |
| *G06Q 30/02* | (2023.01) |
| *G06Q 30/0601* | (2023.01) |

(52) U.S. Cl.
CPC ....... *G06F 16/951* (2019.01); *G06Q 30/0278* (2013.01); *G06Q 30/0627* (2013.01); *G06Q 30/0643* (2013.01); *G06F 16/9577* (2019.01)

(58) Field of Classification Search
CPC .............. G06F 16/951; G06Q 30/0278; G06Q 30/0627; G06Q 30/0643
USPC ....................................................... 707/709
See application file for complete search history.

(56) References Cited

U.S. PATENT DOCUMENTS

| | | | | |
|---|---|---|---|---|
| 7,712,141 | B1 * | 5/2010 | Agrawal | H04L 67/535 |
| | | | | 713/168 |
| 8,997,226 | B1 * | 3/2015 | Call | H04L 63/1483 |
| | | | | 709/224 |
| 10,749,926 | B2 * | 8/2020 | Whitt | H04L 67/025 |
| 11,233,841 | B2 * | 1/2022 | Wei | H04L 67/02 |
| 11,424,012 | B1 * | 8/2022 | Rai | G16H 10/60 |
| 2002/0138624 | A1 * | 9/2002 | Esenther | H04L 9/40 |
| | | | | 709/227 |
| 2007/0239604 | A1 * | 10/2007 | O'Connell | G06F 21/55 |
| | | | | 705/50 |
| 2012/0030294 | A1 * | 2/2012 | Piernot | H04L 67/565 |
| | | | | 709/206 |

(Continued)

OTHER PUBLICATIONS

Hackaholic, Detecting installed plugins under different browsers?, Apr. 18, 2013, https://stackoverflow.com/questions/5188908/detecting-installed-plugins-under-different-browsers (Year: 2013).*

(Continued)

*Primary Examiner* — Sherief Badawi
*Assistant Examiner* — Jessica N Le
(74) *Attorney, Agent, or Firm* — Osha Bergman Watanabe & Burton LLP

(57) ABSTRACT

A method includes receiving a request from a client web browser, generating a first instruction responsive to the request, modifying header information in the first instruction to produce a first header-modified instruction, forwarding the first header-modified instruction to a first target website, receiving a first response from the first target website, modifying, using a man in the middle (MITM) proxy, the first response to produce a modified first response, and sending a result to the client web browser responsive to the modified first response.

20 Claims, 11 Drawing Sheets

(56)        References Cited

U.S. PATENT DOCUMENTS

| | | | | |
|---|---|---|---|---|
| 2013/0024759 | A1* | 1/2013 | Yuan | G06F 16/9574 |
| | | | | 715/205 |
| 2013/0091450 | A1* | 4/2013 | Yi | G06F 16/9535 |
| | | | | 715/765 |
| 2014/0282872 | A1* | 9/2014 | Hansen | H04L 63/102 |
| | | | | 726/3 |
| 2015/0154059 | A1* | 6/2015 | Teng | G06F 9/541 |
| | | | | 719/328 |
| 2016/0042183 | A1* | 2/2016 | Ciordas | G06F 21/73 |
| | | | | 726/26 |
| 2016/0330173 | A1* | 11/2016 | Rene | H04L 9/08 |
| 2016/0357583 | A1* | 12/2016 | Decker | G06F 8/62 |
| 2016/0359904 | A1* | 12/2016 | Ben Ezra | H04L 63/1458 |
| 2017/0063923 | A1* | 3/2017 | Yang | G06F 21/56 |
| 2017/0076092 | A1* | 3/2017 | Kashyap | G06F 21/316 |
| 2017/0346851 | A1* | 11/2017 | Drake | H04L 9/0838 |
| 2020/0045131 | A1* | 2/2020 | Nigam | H04L 67/52 |
| 2021/0097174 | A1* | 4/2021 | Mandal | G06F 21/554 |
| 2021/0352048 | A1* | 11/2021 | Guise, Jr. | H04L 12/4675 |
| 2022/0103525 | A1* | 3/2022 | Shribman | G06F 16/955 |
| 2022/0114598 | A1* | 4/2022 | Perkna | G06Q 30/00 |
| 2022/0263861 | A1* | 8/2022 | Marozas | G06F 21/552 |
| 2022/0321563 | A1* | 10/2022 | Keller | G06N 5/04 |
| 2022/0358173 | A1* | 11/2022 | Chow | G06F 40/284 |
| 2023/0018983 | A1* | 1/2023 | Vilcinskas | G06F 16/951 |
| 2023/0102210 | A1* | 3/2023 | Tendolkar | G06F 9/451 |
| | | | | 715/204 |
| 2023/0113581 | A1* | 4/2023 | Keating | G06Q 10/107 |
| | | | | 455/411 |
| 2023/0188565 | A1* | 6/2023 | Lin | H04L 63/168 |
| | | | | 726/22 |
| 2023/0259562 | A1* | 8/2023 | Hwang | G06F 16/951 |
| | | | | 707/709 |
| 2023/0273990 | A1* | 8/2023 | Call | H04L 63/1441 |
| | | | | 726/23 |

OTHER PUBLICATIONS

Hackaholic et al., "Detecting installed plugins under different browsers?", Apr. 18, 2013, https://stackoverflow.com/questions/5188908/detecting-installed-plugins-under-different-browsers, 4 pages. (Year: 2013).*

Casperson, "Selenium series: modifying HTTP responses", Oct. 1, 2018, https://octopus.com/blog/selenium/15-modifying-http-responses/modifying-http-responses, p. 5. (Year: 2018).*

Satchel, "How can I modify the Response (substituting strings) using JavaScript?", Dec. 31, 2020, https://stackoverflow.com/questions/65516289/how-can-i-modify-the-response-substituting-strings-using-javascript, p. 3. (Year: 2020).*

Hartlenn et al., "Limit the number of plugins that can be installed in a WordPress installation", Jan. 24, 2018, https://wordpress.stackexchange.com/questions/291964/limit-the-number-of-plugins-that-can-be-installed-in-a-wordpress-installation, 4 pages. (Year: 2018).*

* cited by examiner

Aggregator block diagram

Aggregator
300

Client-to-Target
Request
Converter
400

Target Website
800

Proxy Server

900

1000

Figure 11:
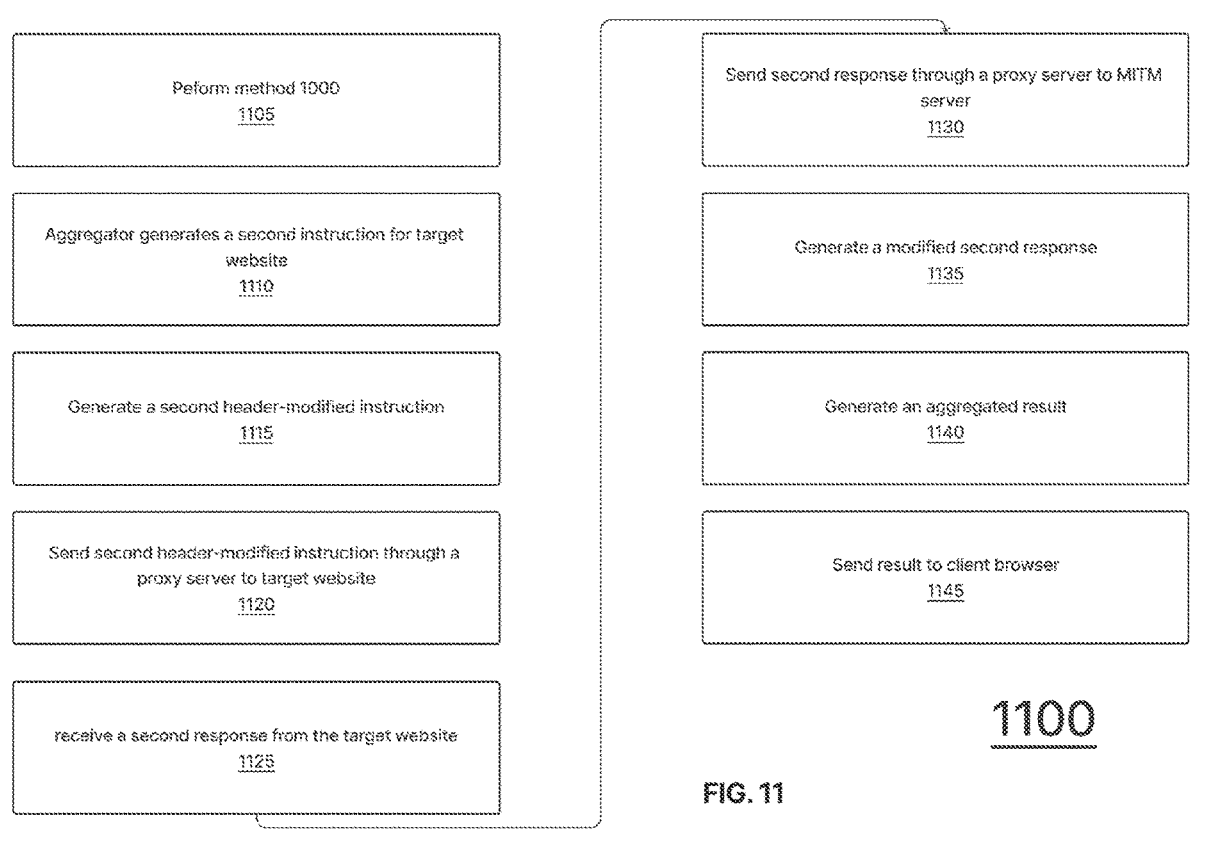

Peform method 1000
1105

Aggregator generates a second instruction for target website
1110

Generate a second header-modified instruction
1115

Send second header-modified instruction through a proxy server to target website
1120 receive a second response from the target website
1125

Send second response through a proxy server to MITM server
1130

Generate a modified second response
1135

Generate an aggregated result
1140

Send result to client browser
1145

SYSTEMS AND METHODS FOR WEB SCRAPING

CROSS-REFERENCE TO RELATED APPLICATIONS

This application claims priority from U.S. Provisional application No. 63/317,945, filed Mar. 8, 2022, the entire contents of which are hereby incorporated by reference.

BACKGROUND OF INVENTION

Web scraping, while not always seen by its users, provides an essential backbone to the operation of the internet. A simple search on Google or other search engine provider leverages the data collected by millions of web scrapers that are indexing the information of the web on a daily basis. These large organizations have built billion dollar businesses on their ability to access, retrieve, and analyze data on any given webpage. Beyond traditional search engines, web scraping is used to aggregate listings and pricing information across dozens of industries like housing, automotive, air transportation, insurance, entertainment, hotels.

Current web scraping approaches leverage pro-active data aggregation by continuously pinging desired endpoints for updated data. For a search engine, this may mean requesting every single webpage known to the system in sequence at a given repetition rate. For a hotel booking site, this may mean daily web scraping of a list of top hotel providers. While different from search engines in their limited scope, both options present similar experiences to end users in that the data being provided acts a snapshot of the information retrieved at the most recent scrape. This strategy is effective for generalized data like a company's home page, but not for data that requires input on behalf of the user beyond the type of desired content.

SUMMARY OF INVENTION

In accordance with some embodiments of the present disclosure, a system comprises a client web browser; an aggregator that receives a request from the client web browser and generate a first instruction responsive to the request; a header manipulator that modifies header information in the first instruction to produce a first header-modified instruction; a proxy server that forwards the first header-modified instruction to a first target website and receives a first response from the first target website; and a man in the middle (MITM) proxy that receives the first response, modifies the first response, and forwards a modified first response to the aggregator website; wherein the aggregator sends a result to the client web browser responsive to the modified first response.

In some aspects, the aggregator generates a second instruction responsive to the request; the header manipulator modifies header information in the second instruction to produce a second header-modified instruction; the proxy server forwards the second header-modified instruction to a second target website and receives a second response from the second target website; and the MITM proxy receives the second response, modifies the second response, and forwards a modified second response to the aggregator; wherein the result sent to the client web browser by the aggregator is responsive to the modified first response and the modified second response.

In accordance with some embodiments of the present disclosure, a method comprises: receiving a request from a client web browser; generating a first instruction responsive to the request; modifying header information in the first instruction to produce a first header-modified instruction; forwarding the first header-modified instruction to a first target website; receiving a first response from the first target website; modifying, using a man in the middle (MITM) proxy, the first response to produce a modified first response; and sending a result to the client web browser responsive to the modified first response.

In some aspects, the method further comprises: generating a second instruction responsive to the request; modifying header information in the second instruction to produce a second header-modified instruction; forwarding the second header-modified instruction to a second target website and receiving a second response from the second target website; and modifying, using the MITM proxy, the second response to produce a modified second response; wherein sending the result to the client web browser comprises: extracting a first attribute from the modified first response, extracting a second attribute from the modified second response, and aggregating the first attribute and the second attribute to generate the result.

Other aspects and advantages of the invention will be apparent from the following description and the appended claims.

BRIEF DESCRIPTION OF DRAWINGS

FIGS. 10-11 show non-limiting examples of methods to extract information from a target website and aggregate it with information from other target websites, in accordance with one or more embodiments of the present disclosure.

DETAILED DESCRIPTION

Figure 1:
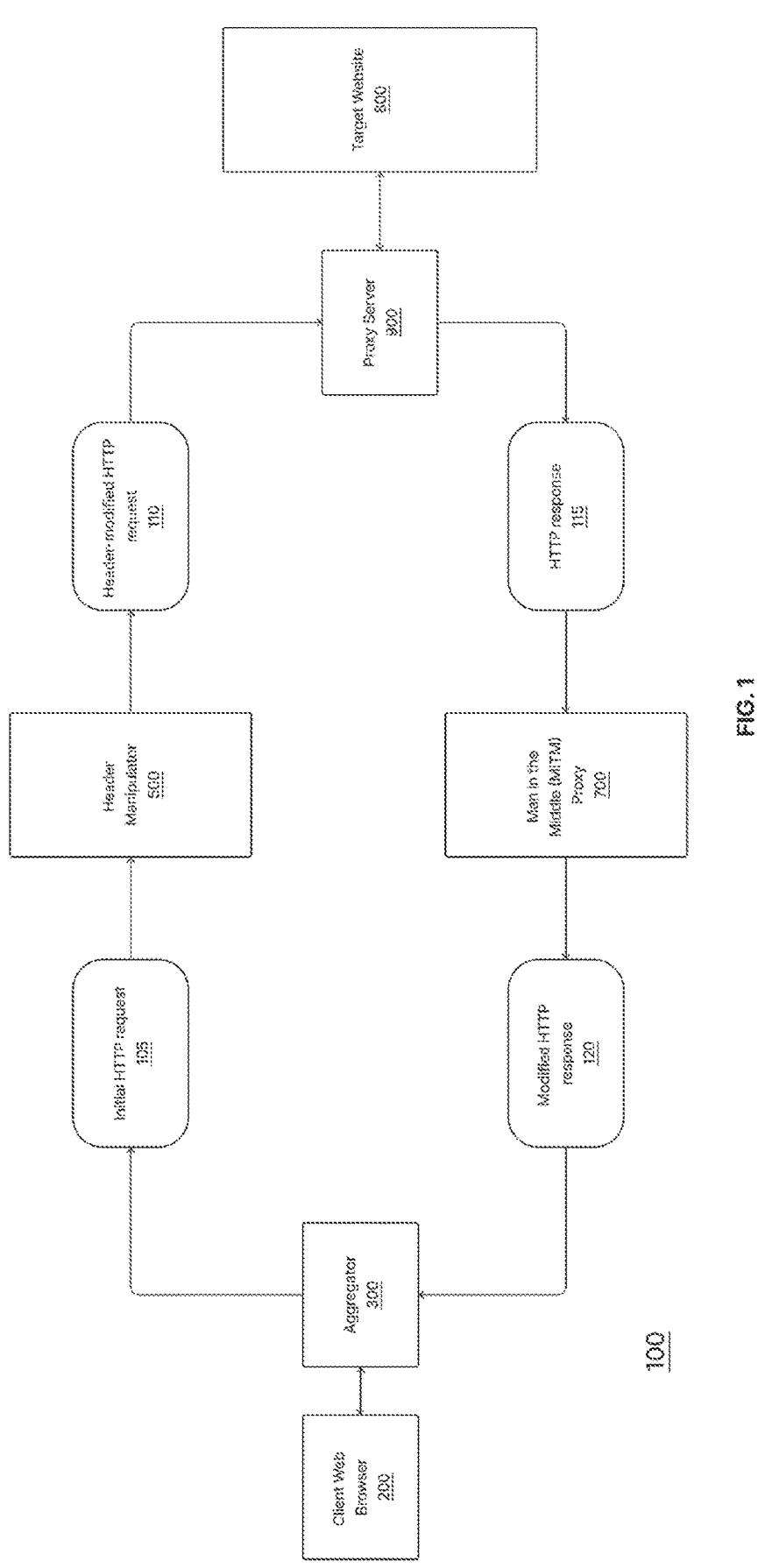
FIGS. 1-5 show non-limiting examples of systems and methods to extract information from a target website and aggregate it with information from other target websites, in accordance with one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-11 any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a model parameter" includes reference to one or more of such parameters.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

In accordance with some embodiments, the systems and methods disclosed herein involve a sequence of steps that result in a used-generated scraping mechanism to extract information from a target website and aggregate it with information from other target websites.

Systems and Methods to Extract Information from a Target Website and Aggregate It with Information from Other Target Websites FIG. 1 illustrates an example implementation of a web scraping system to extract information from a target website and aggregate it with information from other target websites (100), according to some embodiments. Web scraping is a widely used mechanism for acquiring and aggregating data on the internet to combine it into searchable, readable, and consumable form for users. This may include data like the timetables and pricing for flights, cost for a hotel room in a given city, or what restaurants operate nearby. Current web scraping approaches apply a 'acquire everything in advance and then display it when necessary' strategy. This includes, but is not limited to, Google and Microsoft's search engines that regularly ping webpages to retrieve and then cache any new information (e.g., make a copy) on their own servers to relay to potential users. Similarly, hotel booking sites like Expedia or Priceline must constantly be reaching out to individual hotel sites to retrieve updated pricing data as it changes on the hotel's side so that they can provide it 'immediately' (as quickly as possible) to their end users. Beyond being a waste of resources for crawled (e.g., scraped) pages that are never accessed, this approach also precludes the ability to add any user-specific input to the corresponding search. For example, a generalized web scraper can go to a car insurance website and pull generic pricing for an insurance product, but it cannot retrieve the exact quote a given user would receive because it requires knowledge of the user being quoted. This makes it impossible to scrape in advance of having the user arrive on the aggregation site. In other words, the process cannot be done in advance. The corresponding scraping strategy to achieve this, hereby named 'just-in-time web scraping', has been widely ignored in web scraping approaches due to the relative simplicity of the 'acquire everything in advance and then display it when necessary' strategy.

The example system in 100 illustrates an example implementation of the 'just-in-time' web scraping approach. The system may include a client web browser (200) that can allow the end user to interact with the aggregator (300) and generate new just-in-time scraping requests. These may include, but are not limited to, requests for offers from dealers for their used vehicle, requests for offers from jewelry stores for their used jewelry, requests for personalized quotes for various insurance products, requests for offers on their house, and any other situation where the user must first provide personalized information to generate the resulting aggregation. The aggregator (300) converts the requests received by the client web browser (200) into a set or sets of new requests that can be interpreted by the target websites to be scraped. One embodiment of this may include an example where a user requests offers for their vehicle through a client web browser (200). In response, an aggregator (300) could generate a set of instructions to scrape a set of car dealer websites and retrieve a final aggregated result. The aggregator (300) generates a request, the initial HTTP request (105), which can retrieve data, perform some action, post data, or other web functions on the target website (700).

The rapid growth in the number of global web scrapers active at any given time, paired with the massive waste in processing power associated with the 'acquire everything in advance and then display it when necessary' scraping strategy, has resulted in many websites adding complex anti-scraping and bot detection protocols to minimize constant re-reading of their site data. Despite the fact that most webmasters appreciate aggregators increasing their site's presence, the drain on resources can be expensive, highlighting another benefit of systems implementing just-in-time scraping to only retrieve specific data that's been requested. Nonetheless, the intent of scrapers cannot be known by the webmaster and as such to implement either scraping strategy on modern, high-traffic sites may require implementation of bot-detection avoidance systems. In some embodiments, the system of (100) may be an emulator of human-like browsing behaviors that make the bot, or system (100), indistinguishable from a typical human user.

In typical personal web-browsing, a client can communicate directly with a target website (700) with no steps, other than the protocol layer of the internet such as DNS servers, in between them. In the case of an aggregator (300), the target website (700) may decide immediately, over time, or intermittently to not to allow any more calls after some number, density, or some other metric of requests. Despite being legitimate requests on behalf of individual web users, the target website (700) may see a sequence of requests coming from a single source: the aggregator (300). The example embodiment mitigates this by instead sending an initial HTTP request (105) into a header manipulator (500), which can alter the structure and contents of the initial http request header to generate a new, header-modified HTTP request (110). A header-modified HTTP request may include, but is not limited to, a changed user agent, referrer, source, medium, or any other header attribute. A first header-modified HTTP request may contain differing information from a second header-modified HTTP request, reducing the likelihood of a target website (700), recognizing the origin of the initial HTTP request (105). A header-modified HTTP request (110) may be sent through a proxy server (900) which further alters header attributes of the header-modified HTTP request (110) by diverting all traffic through its IP address to the target website (700). A target website (700) may generate a response that is also diverted through the proxy server (900) to generate an HTTP response (115). An HTTP response can be intercepted by a Man in the Middle Proxy (700) which generates a modified HTTP response (120) that can be sent back to the aggregator (300).

In some embodiments, the example system of FIG. 1 can be used as a testing tool for anti-scraping and bot detection software to determine their overall effectiveness and ability to catch users implementing complex scraping architectures.

Figure 2:
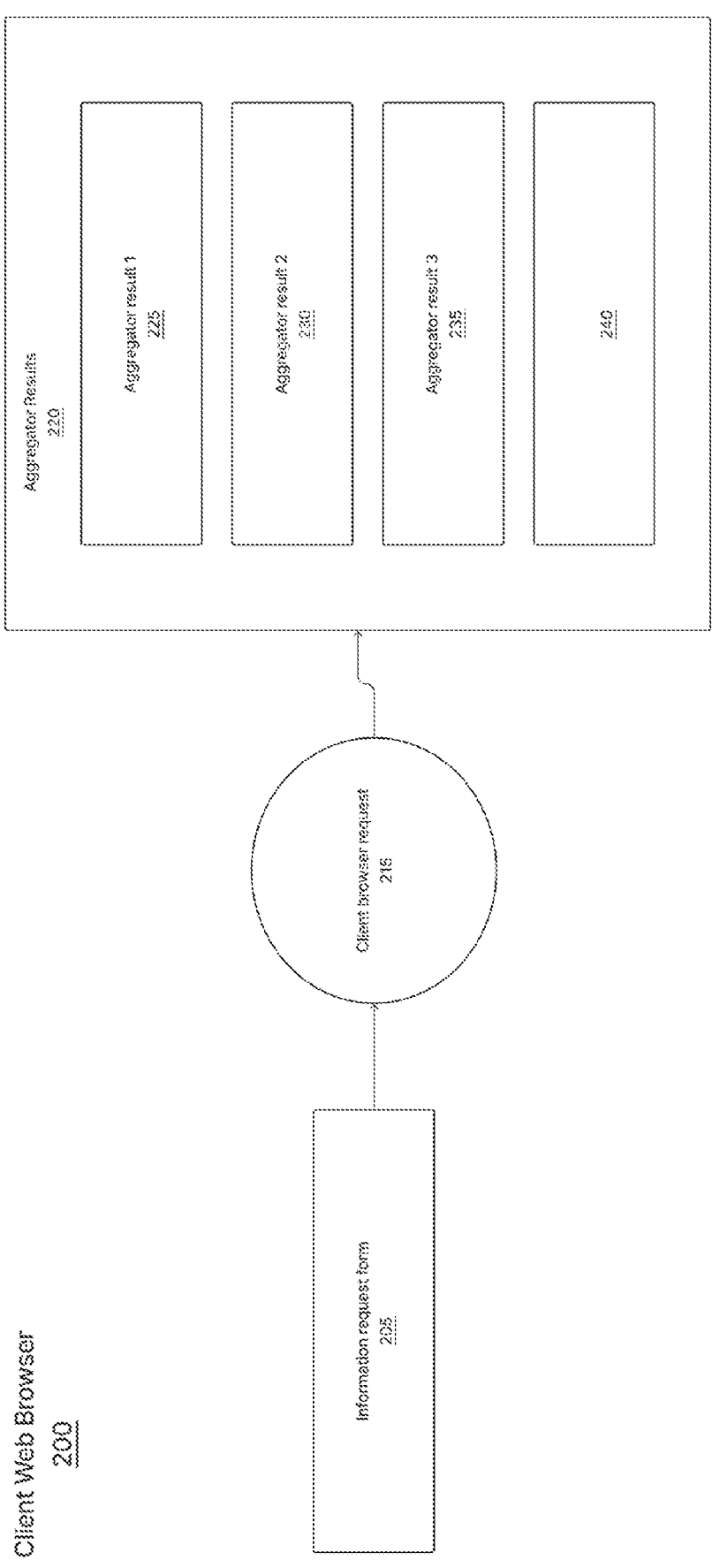

FIG. 2 illustrates an example implementation of a client web browser (200), according to some embodiments. A client web browser (200) can allow end users to complete an information request form (205), which initiates a client browser request (215) to the aggregator (300). The resulting responses from the aggregator (300) can then be showcased to the end user in the aggregator results (220), where individual results can be displayed as aggregator result 1, 2, and 3 (225, 230, 235, respectively).

Figure 3:
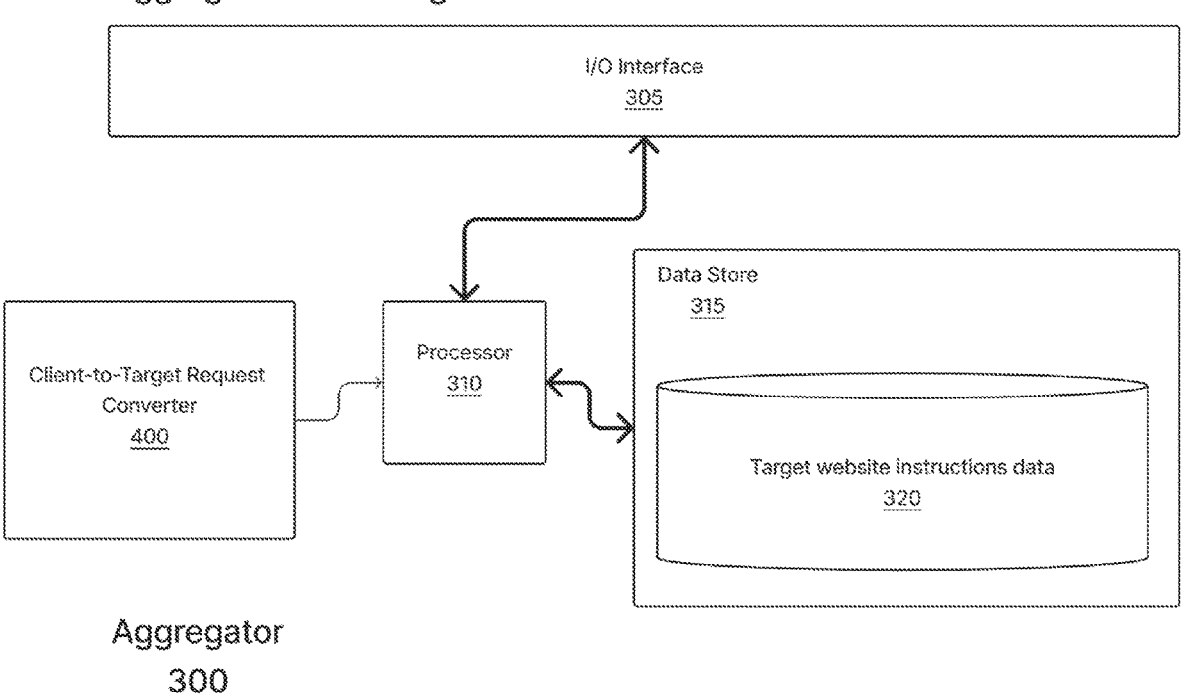

FIG. 3 illustrates an example implementation of an aggregator (300), according to some embodiments. An aggregator (300) may include, but is not limited to, a processor (310), an I/O interface (305) for communicating, a data store (315) that contains target website instructions data (320), and a client-to-target request converter (400).

Figure 4:
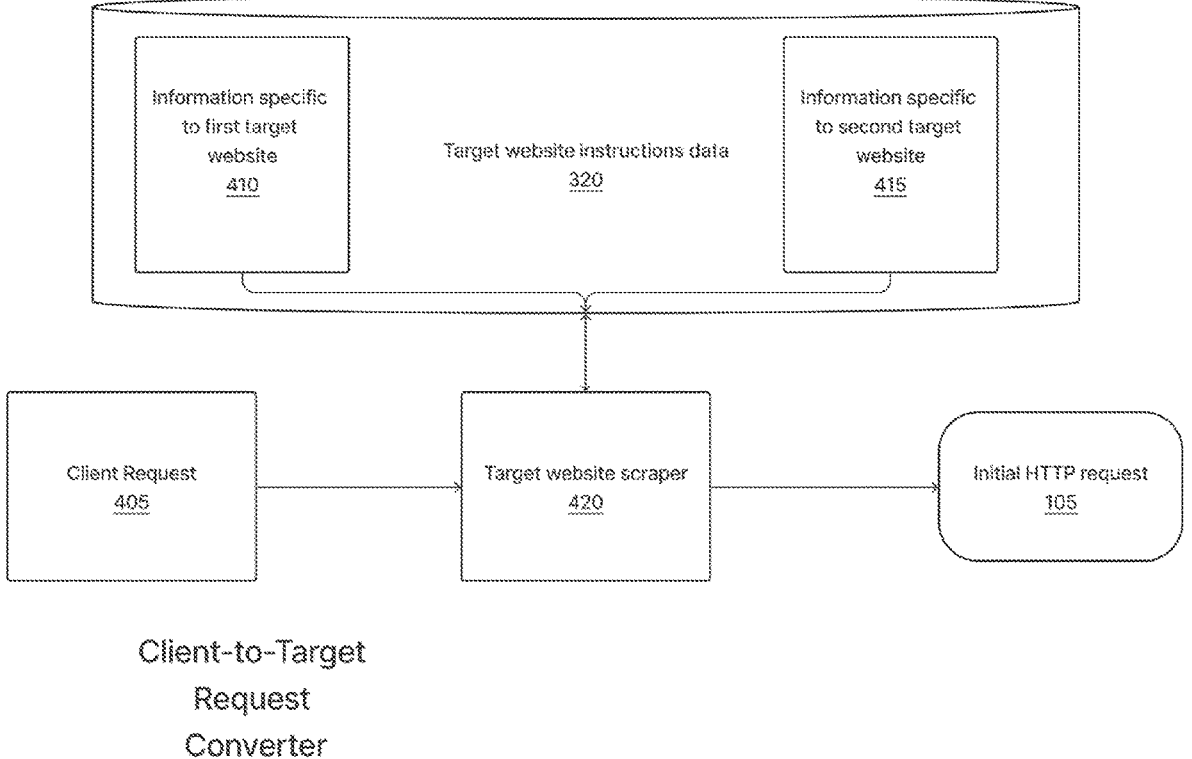

FIG. 4 illustrates an example implementation of a client-to-target request converter (400), according to some embodiments. A client-to-target request converter (400) can used stored information specific to a first target website (410) and a second target website (415) to generate an initial http request (105) depending on the type of request sent in a client request (405). A target website scraper (420) can make the determination, based on the client request (405), of which website information to use and the necessary sequence of instructions for the target website. In some embodiments, the client-to-target request converter (400) can implement anti-bot strategies to minimize the chance of its actions being flagged or otherwise classified as non-human. These may include, but are not limited to, random and automated moving of the mouse (pointer) on the webpage, clicking on the page in varying sequences, altering the page crawl sequence to follow the typical user journey, adding wait times between action execution, and more.

Figure 5:
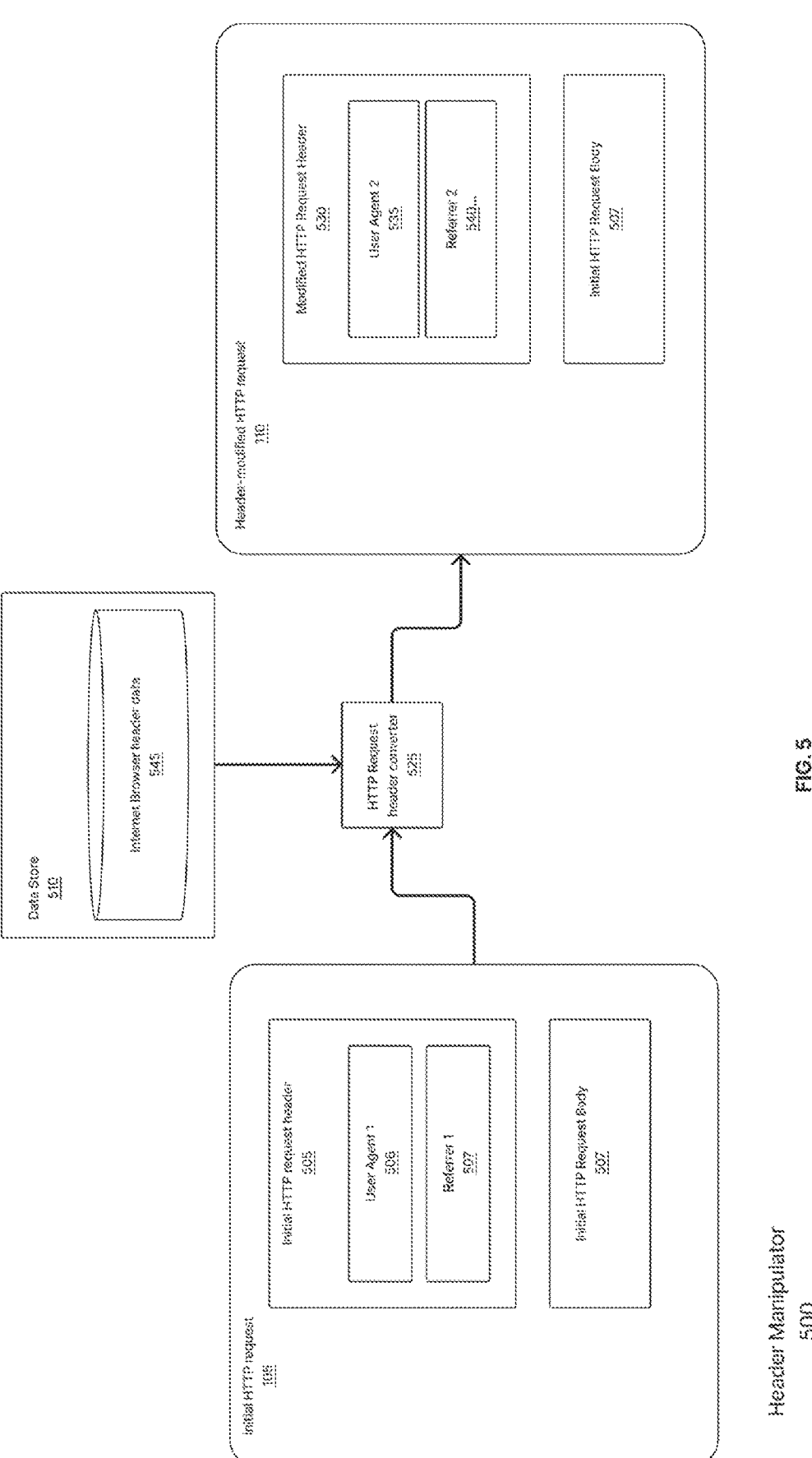

FIG. 5 illustrates an example implementation of a header manipulator (500), according to some embodiments. A header manipulator (500) can take an incoming initial HTTP request (105), with an initial HTTP request header (505) that may contain user agent 1 (506) and or referrer 1 (507), and generate a corresponding header-modified HTTP request (110) that may contain updated header information in the modified HTTP request header (530). An HTTP request header converter (525) can extract the initial HTTP request header (505) attributes, in some embodiments a user agent 1 (506) and a referrer 1 (507), to generate a modified HTTP request header (530) that may contain a user agent 2 (535) and/or a referrer 2 (540) with modified information. In some embodiments the initial HTTP request body (507) may be passed along unchanged, while in others it may also be updated with new or altered data.

Figure 6:
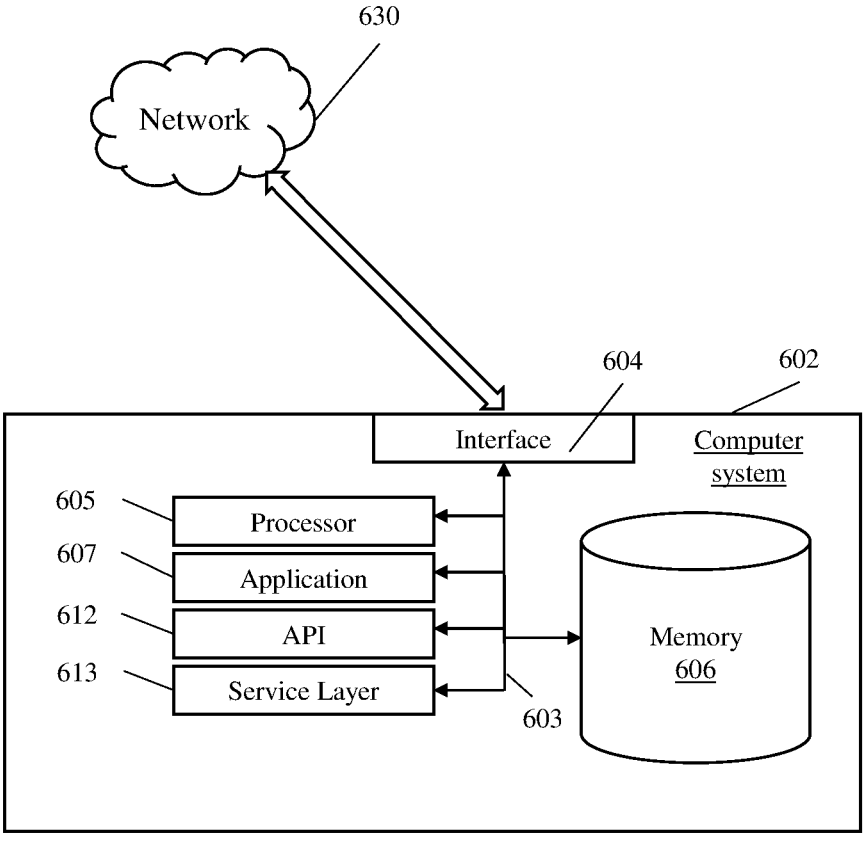
FIG. 6 shows a computer system in accordance with one or more embodiments of the present disclosure.

FIG. 6 shows a computer system in accordance with one or more embodiments. FIG. 6 further depicts a block diagram of a computer system (602) used to provide computational functionalities associated with described algorithms, methods, functions, processes, flows, and procedures as described in this disclosure. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system (602) may include a computer system that includes an input device, such as a keypad, keyboard, touch screen, or other device that can accept user information, and an output device that conveys information associated with the operation of the computer system (602), including digital data, visual, or audio information (or a combination of information), or a graphical user interface (GUI).

The computer system (602) can serve in a role as a client, network component, a server, a database or other persistency, or any other component (or a combination of roles) of a computer system (602) for performing the subject matter described in the instant disclosure. The illustrated computer system (602) is communicably coupled with a network (630). In some implementations, one or more components of the computer system (602) may be configured to operate within environments, including cloud-computing-based, local, global, or other environment (or a combination of environments).

At a high level, the computer system (602) is an electronic computing device operable to receive, transmit, process, store, or manage data and information associated with the described subject matter. According to some implementations, the computer system (602) may also include or be communicably coupled with an application server, e-mail server, web server, caching server, streaming data server, business intelligence (BI) server, or other server (or a combination of servers).

The computer system (602) can receive requests over network (630) from a client application (for example, executing on another computer system (602) and responding to the received requests by processing the said requests in an appropriate software application. In addition, requests may also be sent to the computer system (602) from internal users (for example, from a command console or by other appropriate access method), external or third-parties, other automated applications, as well as any other appropriate entities, individuals, systems, or computers.

Each of the components of the computer system (602) can communicate using a system bus (603). In some implementations, any or all of the components of the computer system (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer system (602) or other components (whether or not illustrated) that are communicably coupled to the computer system (602). The functionality of the computer system (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer system (602), alternative implementations may illustrate the API (612) or the service layer (613) as stand-alone components in relation to other components of the computer system (602) or other components (whether or not illustrated) that are communicably coupled to the computer system (602). Moreover, any or all parts of the API (612) or the service layer (613) may be implemented as child or sub-modules of another software module, enterprise application, or hardware module without departing from the scope of this disclosure.

The computer system (602) includes an interface (604). Although illustrated as a single interface (604) in FIG. 6, two or more interfaces (604) may be used according to particular needs, desires, or particular implementations of the computer system (602). The interface (604) is used by the computer system (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer system (602).

The computer system (602) includes at least one computer processor (605).

Although illustrated as a single computer processor (605) in FIG. 6, two or more processors may be used according to particular needs, desires, or particular implementations of the computer system (602). Generally, the computer processor (605) executes instructions and manipulates data to perform the operations of the computer system (602) and any algorithms, methods, functions, processes, flows, and procedures as described in the instant disclosure.

The computer system (602) also includes a memory (606) that holds data for the computer system (602) or other components (or a combination of both) that can be connected to the network (630). For example, memory (606) can be a database storing data consistent with this disclosure. Although illustrated as a single memory (606) in FIG. 10, two or more memories may be used according to particular needs, desires, or particular implementations of the computer system (602) and the described functionality. While memory (606) is illustrated as an integral component of the computer system (602), in alternative implementations, memory (606) can be external to the computer system (602).

The application (607) is an algorithmic software engine providing functionality according to particular needs, desires, or particular implementations of the computer system (602), particularly with respect to functionality described in this disclosure. For example, application (607) can serve as one or more components, modules, or applications. Further, although illustrated as a single application (607), the application (607) may be implemented as multiple applications (607) on the computer system (602). In addition, although illustrated as integral to the computer system (602), in alternative implementations, the application (607) can be external to the computer system (602).

There may be any number of computers (602) associated with, or external to, a computer system (602), wherein each computer (602) communicates over network (630). Further, the term "client," "user," and other appropriate terminology may be used interchangeably as appropriate without departing from the scope of this disclosure. Moreover, this disclosure contemplates that many users may use one computer system (602), or that one user may use multiple computer systems (602).

Figure 7:
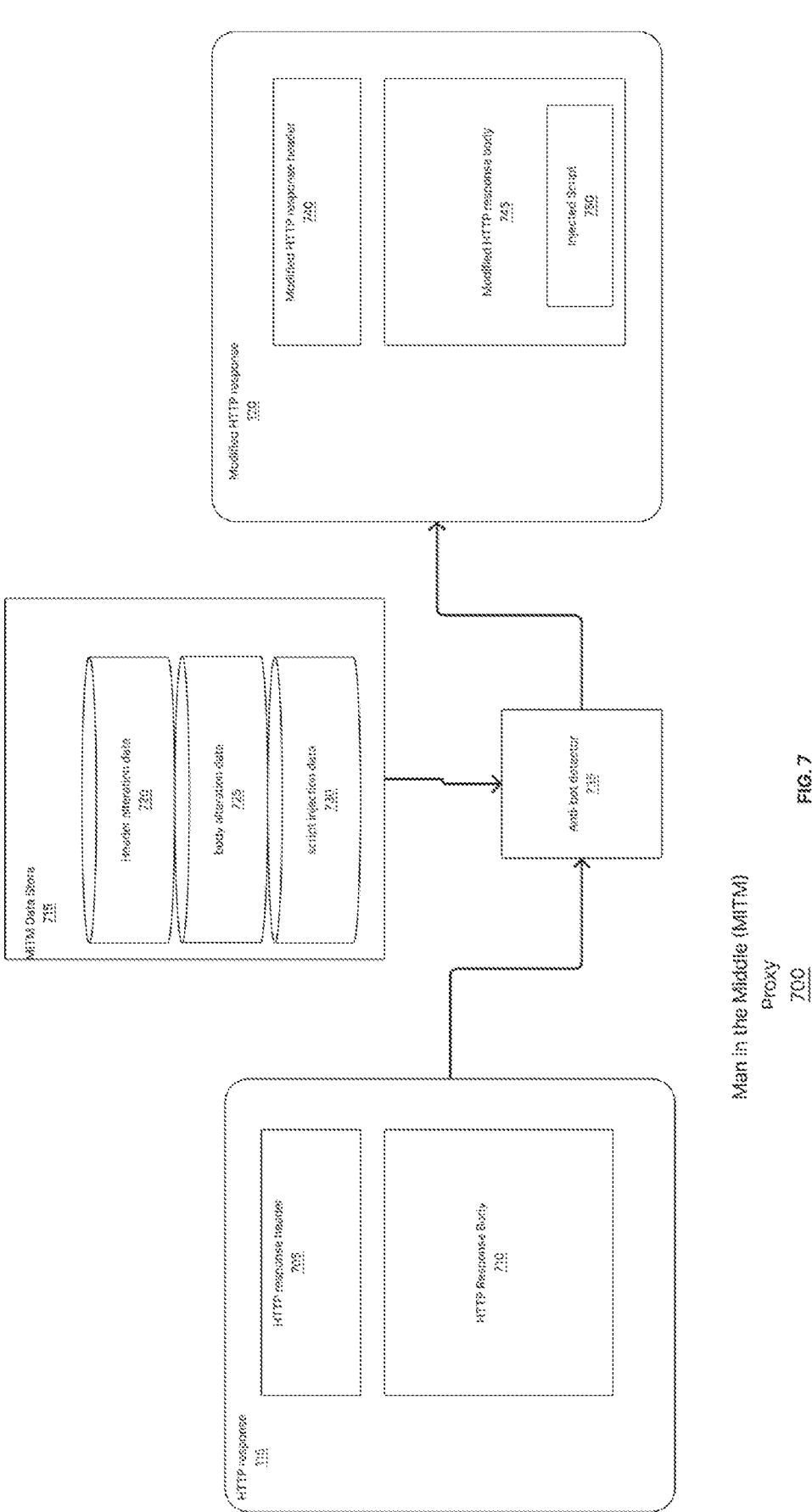
FIGS. 7-9 show non-limiting examples of systems and methods to extract information from a target website and aggregate it with information from other target websites, in accordance with one or more embodiments of the present disclosure.

FIG. 7 illustrates an implementation of a man in the middle (MITM) proxy (700), according to some embodiments. The MITM Proxy, in accordance with some embodiments, may be a server or virtual embodiment of a server that can accept an HTTP response (115) and alter either or both of its HTTP components: the HTTP response header (705) and the HTP response body (710), to create a modified HTTP response (120). An MITM proxy (700) can be configured with an MITM data store (715) that may contain header alteration data (720), body alteration data (725), and script injection data (730). The MITM data store (715) can provide the instructions for the anti-bot detector (735) to alter the HTTP response (115) in a way that keeps modified HTTP response body (745) from indicating the viewer as a bot when the page is viewed by an aggregator (300).

Traditional mechanisms of bot detection like IP address blocking are still well in force today, but have become less effective as more sophisticated scrapers grow in popularity. As such, some sites now employ user-action, user-motion, and other inputs from the end user to feed back into bot detection systems and lock out users deemed not to be human. Often these front-end tracking systems operate using JavaScript or similar language platforms that can request information from the web browser such as where the mouse is, what part of the screen is being viewed, where users click, the speed at which they click, and many more metrics. The most sophisticated bot detection systems may use a combination of user click speed, movement, page sequence tracking, and DOM attribute checking. While the three former rely on the design and implementation of the scraping code a bot is executing, the latter is only controllable if you have access the client DOM before any JavaScript is executed.

FIG. 7. illustrates an example implementation of a system to override the results of JavaScript run on the client HTTP page by injecting additional scripts into the page before it's viewed and the page script executed. An anti-bot detector (735) can use script injection data (730) to modify HTTP response body (710) by appending an injected script (750), thereby creating a modified HTTP response body (745). In some embodiments this script can be designed to alter the results of an on-page JavaScript call to determine the number of plugins installed in the browser. Web scraping browsers in nearly all cases do not have plugins installed, so bot detection software uses this metric to make decisions on which users are human and which are bots. By altering the perceived value of this attribute by the target website, the injected script (750) can maintain its classification as a 'human' user. Further examples of possible spoofed attributes include, but are not limited to, browser languages, browser type, user agent, webGL rendering context, height and width of displayed images (scrapers often don't load images), and more.

Figure 8:
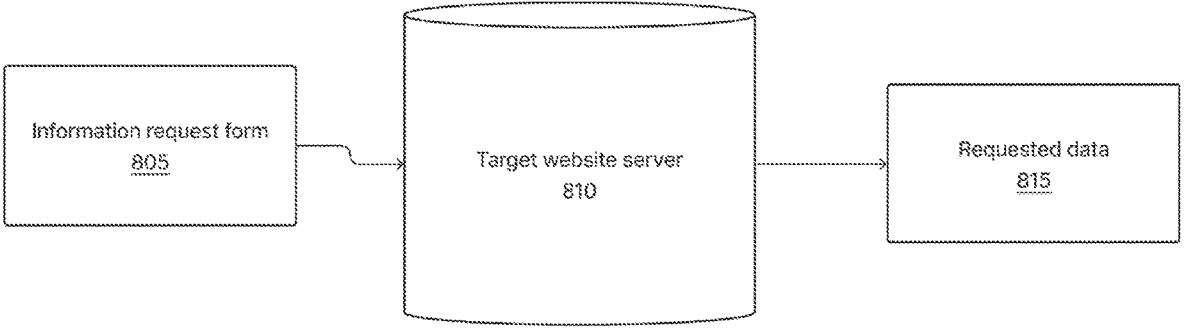
Figure 9:
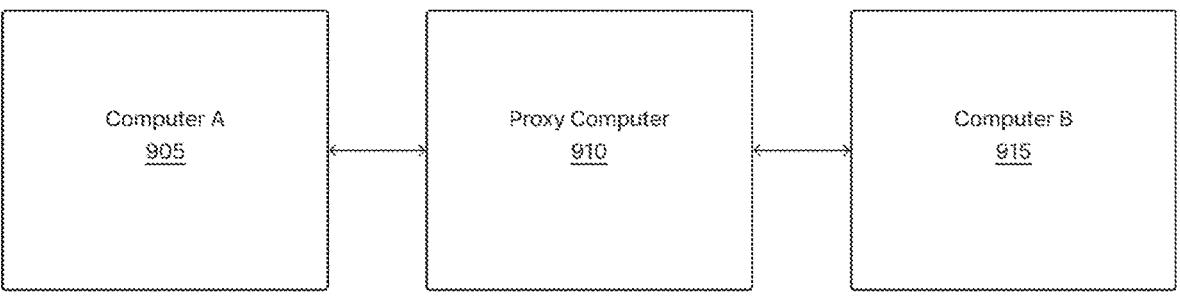

FIG. 8. illustrates an example of a target website (800), according to some embodiments. A target website (800) to be scraped may contain an information request form (805) that the scraper can use to input user data and generate a response from the website. The information request form (805) may be sent to the target website server (810) which can then respond with the requested data (815). In some embodiments this can include, but is not limited to, submitting the condition of a used product to retrieve offer or pricing data for that item, requesting services, requesting quotes, etc. on behalf of the end user FIG. 9. illustrates an example of a proxy server (900), according to some embodiments. A proxy server (900) is a mechanism designed to mask the identity of an internet user. In normal conditions, if a computer A (905) requested data from a computer B (915), the computer B (915) would be able to see that the request came from computer A's IP address. IP addresses can then be used to extract a variety of information, including, but not limited to, physical location, ISP provider, personal information and more. In a system using a proxy server, a computer A (905) communicates only to a proxy computer (910), which in turn communicates with a computer B (915). The proxy computer (910) can request necessary data on behalf of computer A (905) and pass it along while computer B (915) only sees that it is communicating with the proxy computer (910).

Figure 10:
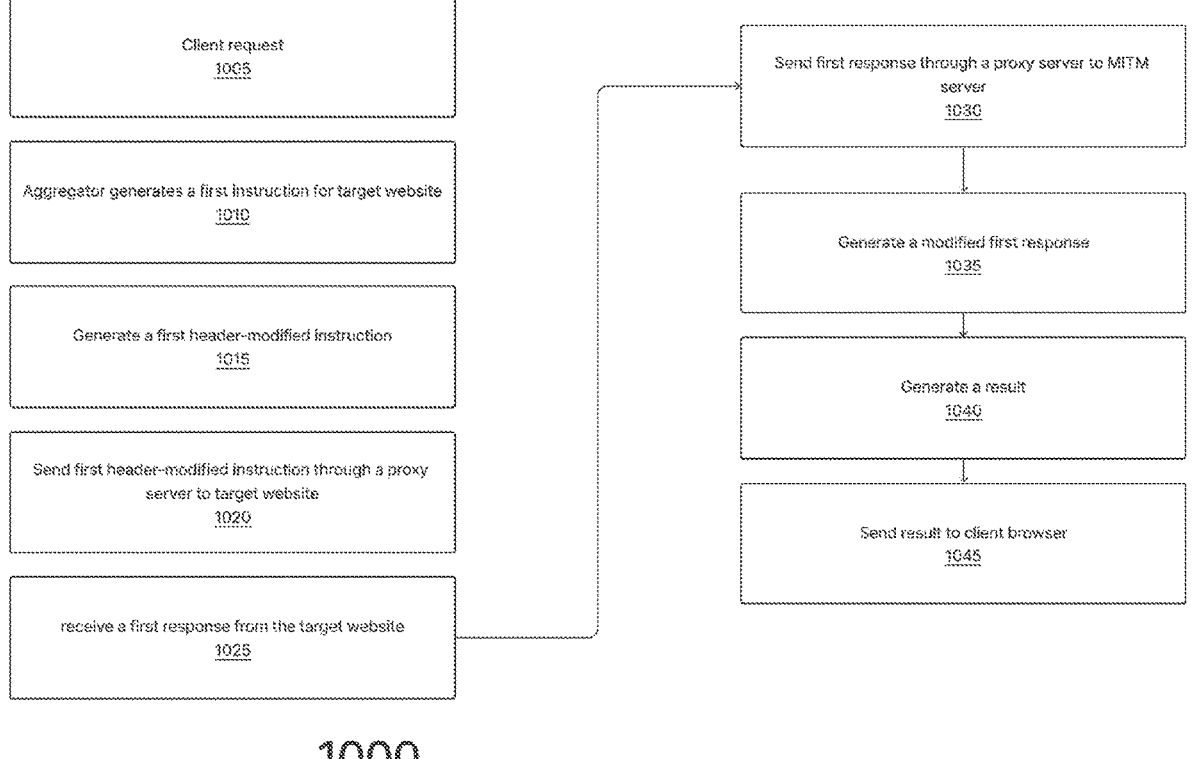

FIG. 10 illustrates an example process (1000) for web scraping to extract a result from a target website, according to some embodiments. Step 1005 can allow a client web browser (200) to generate a request to the aggregator (300). In step 1010, the aggregator (300) may generate a first instruction for a target website based on the requested received in step 1005. In step 1015, a header manipulator can generate a first header-modified instruction. In step 1020, a header-modified instruction may be sent through a proxy server to a target website. In step 1025, process 1000 may receive a first response from the target website, which in step 1030 may be sent through a proxy server to an MITM server. In step 1035, an MITM can generate a modified first response to send back to an aggregator. In step 1040 an aggregator can generate a result which in step 1045 may be sent to the client browser for display.

FIG. 11 illustrates an example process (1100) for web scraping to extract information from a target website and aggregate it with information from other target websites, according to some embodiments. Step 1105 can allow a client web browser (200) to generate a request to the aggregator (300). In step 1110, the aggregator (300) may generate a second instruction for a target website based on the requested received in step 1105. In step 1115, a header manipulator can generate a second header-modified instruction. In step 1120, a header-modified instruction may be sent through a proxy server to a target website. In step 1125, process 1100 may receive a second response from the target website, which in step 1030 may be sent through a proxy server to an MITM server. In step 1135, an MITM can generate a modified second response to send back to an aggregator. In step 1140 an aggregator can generate a aggregated result that combines the modified first response from process 1000 with the modified second response. In step 1145 the aggregated result can be sent to the client browser for display.

In some embodiments, the aggregated response allows the users of the Client Web Browser to quickly view an array of options available to them. An example embodiment is to be able to view a list of offers from potential buyers of an item they wish to sell that are based specifically on their item. That item may be, for example, a used car. Another embodiment would allow a user to aggregate housing offers based on specific information about their home. In both cases the system allows for users to interact with only one interface while gaining insight across a given market.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a computer system comprising a first hardware processor, a memory, and a client web browser;
an aggregator comprising a second hardware processor, wherein the aggregator receives a Hypertext Transfer Protocol (HTTP) request from the client web browser and generates a first instruction responsive to the HTTP request;
a header manipulator comprising a third hardware processor, wherein the header manipulator modifies first header information in the first instruction to produce a first header-modified HTTP request;
a proxy server comprising a fourth hardware processor, wherein the proxy server forwards the first header-modified HTTP request to a first target website and receives a first HTTP response from the first target website based on the first header-modified HTTP request; and
a man in the middle (MITM) proxy comprising a hardware server, wherein the MITM proxy:
receives the first HTTP response, wherein the first HTTP response comprises a webpage and an on-page JavaScript call configured to perform a first web browser function in the client web browser,
modifies the first HTTP response by adding injected JavaScript data to produce a modified HTTP response,
wherein the modified HTTP response alters a result of the on-page JavaScript call to provide a different perceived value of the first web browser function to the first target website to produce an anti-bot detection protocol for the first target website,
wherein the first web browser function determines a number of plugins that are installed in the client web browser, and
wherein the different perceived value is a number of plugins that is different from the number of plugins installed in the client web browser, and
forwards the modified HTTP response to the aggregator,
wherein the aggregator sends a result to the client web browser responsive to the modified HTTP response.
2. The system of claim 1, wherein:
the aggregator generates a second instruction responsive to the HTTP request;
the header manipulator modifies second header information in the second instruction to produce a second header-modified instruction;
the proxy server forwards the second header-modified instruction to a second target website and receives a second HTTP response from the second target website; and
the MITM proxy receives the second HTTP response, modifies the second HTTP response, and forwards a second modified HTTP response to the aggregator;
wherein the result sent to the client web browser by the aggregator is responsive to the modified HTTP response and the second modified HTTP response.

3. The system of claim 2, wherein the aggregator comprises:

an interface; and a data store;

wherein the data store comprises information specific to the first target website and the second target website.

4. The system of claim 3, wherein the information comprises user interface structure of the first target website and the second target website.

5. The system of claim 1, wherein the aggregator comprises:

an interface; and a data store;

wherein the data store comprises information specific to the first target website.

6. The system of claim 1, wherein the first header information modified by the header manipulator comprises at least one of a user agent and a referer.

7. The system of claim 1, wherein the first HTTP response comprises a first part comprising protocol information and a second part comprising response data.

8. The system of claim 7, wherein the MITM proxy modifies the first HTTP response by adding a script to the second part of the first HTTP response.

9. The system of claim 7, wherein the MITM proxy modifies the first HTTP response by altering the protocol information.

10. The system of claim 1, wherein the result is a value of an item.

11. The system of claim 10, wherein the item is a used vehicle.

12. The system of claim 1, wherein the webpage is configured to perform a second web function that determines a height attribute and a width attribute of a displayed image that is rendered in the client web browser, and wherein the MITM proxy alters a result of a perceived value of the second web function that is received by the first target website.

13. The system of claim 1, wherein the aggregator comprises a client-to-target request converter that performs a random and automated moving of a pointer on a webpage in connection with transmitting the first instruction responsive to the HTTP request, and wherein the random and automated moving of the pointer implements an anti-bot strategy that avoids classification of the computer system as being non-human.

14. A method comprising:

receiving a Hypertext Transfer Protocol (HTTP) request from a client web browser;

generating a first instruction responsive to the HTTP request;

modifying first header information in the first instruction to produce a first header-modified HTTP request;

forwarding the first header-modified HTTP request to a first target website;

receiving a first HTTP response from the first target website based on the first header-modified HTTP request, wherein the first HTTP response comprises a webpage and an on-page JavaScript call configured to perform a web browser function in the client web browser;

modifying, using a man in the middle (MITM) proxy, the first HTTP response to produce a modified HTTP response, wherein the MITM proxy adds injected JavaScript data into the first HTTP response, wherein the modified HTTP response alters a result of the on-page JavaScript call to provide a different perceived value of the web browser function to the first target website to produce an anti-bot detection protocol for the first target website, wherein the web browser function determines a number of plugins that are installed in the client web browser, and wherein the different perceived value is a number of plugins that is different from the number of plugins installed in the client web browser; and sending a result to the client web browser responsive to the modified HTTP response.

15. The method of claim 14, further comprising:

generating a second instruction responsive to the HTTP request;

modifying second header information in the second instruction to produce a second header-modified instruction;

forwarding the second header-modified instruction to a second target website and receiving a second HTTP response from the second target website; and modifying, using the MITM proxy, the second HTTP response to produce a second modified HTTP response;

wherein sending the result to the client web browser comprises:

extracting a first attribute from the modified HTTP response, extracting a second attribute from the second modified HTTP response, and aggregating the first attribute and the second attribute to generate the result.

16. The method of claim 14, further comprising:

storing first target website information in a data store; and using the first target website information to generate the first instruction.

17. The method of claim 16, wherein the first target website information comprises user interface structure of the first target website.

18. The method of claim 14, wherein modifying the first header information comprises modifying at least one of a user agent and a referer.

19. The method of claim 14, wherein the first HTTP response comprises a first part comprising protocol information and a second part comprising response data; and wherein modifying the first HTTP response comprises adding a script to the second part of the first HTTP response.

20. The method of claim 14, wherein the first HTTP response comprises a first part comprising protocol information and a second part comprising response data; and wherein modifying the first HTTP response comprises altering the protocol information.

* * * * *